(12) United States Patent
Joyner (10) Patent No.: US 7,479,247 B2
(45) Date of Patent: Jan. 20, 2009

(54) METHOD AND APPARATUS FOR CREATING SACRIFICIAL PATTERNS AND CAST PARTS

(76) Inventor: Victor Joyner, 15927 Parkside Ave., South Holland, IL (US) 60473-1607

(*) Notice: Subject to any disclaimer, the term of this patent is extended or adjusted under 35 U.S.C. 154(b) by 657 days.

(21) Appl. No.: 11/127,255

(22) Filed: May 12, 2005

(65) Prior Publication Data

US 2006/0255512 A1    Nov. 16, 2006

(51) Int. Cl.
  *B28B 7/06* (2006.01)
  *B29C 35/08* (2006.01)

(52) U.S. Cl. .............. 264/313; 264/494; 425/451.9

(58) Field of Classification Search ........... 264/460, 264/463, 405, 494, 459, 454, 224, 294, 299, 264/313, 317; 425/174.4, 543, 441, 440, 425/450.1, 451.9
See application file for complete search history.

(56) References Cited

U.S. PATENT DOCUMENTS

| | | | |
|---|---|---|---|
| 4,042,654 A | 8/1977 | Leszyk et al. | |
| 4,265,723 A | 5/1981 | Hesse et al. | |
| 4,575,330 A | 3/1986 | Hull | |
| 4,844,144 A | 7/1989 | Murphy et al. | |
| 4,985,472 A | 1/1991 | Aosai et al. | |
| 5,263,533 A | 11/1993 | Druschitz et al. | |
| 5,338,769 A | 8/1994 | Miyamoto | |
| 5,735,336 A | 4/1998 | Oti | |
| 5,753,150 A * | 5/1998 | Martin et al. | 264/2.5 |
| 5,763,503 A | 6/1998 | Cowperthwaite et al. | |
| 5,916,509 A | 6/1999 | Durhman | |
| 5,981,616 A | 11/1999 | Yamamura et al. | |
| 5,990,190 A | 11/1999 | Nakamura et al. | |
| 6,025,114 A | 2/2000 | Popat et al. | |
| 6,171,093 B1 | 1/2001 | Hawkinson | |
| 6,375,887 B1 | 4/2002 | Joyner | |
| 6,758,663 B2 * | 7/2004 | Foreman et al. | 425/155 |
| 6,829,362 B1 | 12/2004 | Kadziela et al. | |
| 2004/0030062 A1 | 2/2004 | Mather et al. | |
| 2004/0077744 A1 * | 4/2004 | Naylor et al. | 522/150 |
| 2004/0092616 A1 | 5/2004 | Errington et al. | |
| 2004/0245677 A1 * | 12/2004 | Marple et al. | 264/496 |

* cited by examiner

*Primary Examiner*—Christina Johnson
*Assistant Examiner*—Galen Hauth
(74) *Attorney, Agent, or Firm*—Harold Gell (57) ABSTRACT

A process for casting three-dimensional parts and sacrificial models from casting compounds forced by pressurized inert gas into transparent molds that are supported by transparent mold frames. The casting compound incorporates radiation activated photo initiators which cause polymerization and curing of the compound within the mold. An automated casting system is anticipated which is enabled by the use of very soft, stretchable and deformable material for the mold body and supporting the mold with radiation transparent mold frames. Oxygen and other gases in the atmosphere react with some casting compounds to create a sticky film on mold cavity walls which causes difficulty when removing a casting from a mold. This problem is eliminated by purging the mold cavity with an inert gas between casts.

6 Claims, 11 Drawing Sheets

METHOD AND APPARATUS FOR CREATING SACRIFICIAL PATTERNS AND CAST PARTS

BACKGROUND OF THE INVENTION

Lost wax casting, a 4000 year old process, is still used today in most types of casting operations that utilize sacrificial patterns. The jewelry casting industry is one of the more prevalent practitioners of the process. It has advanced over the years from using hand carved patterns to current production processes which use rubber molds for creating duplicate sacrificial wax patterns. In contemporary processes, molten wax is injected under pressure into the mold cavity and, because of the frailty of the wax, removed by hand when the wax has hardened. This is a labor intensive, costly process which negates the fact that wax is inexpensive. Wax is cheap and reliable but has limitations. Some plastics have been used for sacrificial patterns but because of the nature of injectable plastics, those patterns have been limited to simple parts. The rigid molds required by the plastic materials do not allow for the complex undercuts that are present in the majority of jewelry patterns. In other words, undercuts create a mechanical lock that does not allow the part to be released from the mold.

FIELD OF THE INVENTION

This invention relates to an automated method and enabling apparatus for casting complex three dimensional parts, such as sacrificial investment models, from fluid compositions which solidify as a result of polymerization after being poured into a mold.

DISCUSSION OF THE RELATED ART

An example of a direct casting technique using photocurable polymers as a casting medium is taught by V. Joyner in U.S. Pat. No. 6,375,887 which is incorporated herein by reference in its entirety. The patent teaches a process and apparatus for casting three-dimensional parts and sacrificial models from a class of casting compounds which are solidified by actinic radiation. The class of casting compounds include, 1) compounds which act as conduits for the actinic radiation during and/or after hardening and 2) compounds which are hardened by an actinic radiation induced chain reaction throughout the body of fluid casting compound. These compounds allow the part being cast to be cured within molds that are opaque. The apparatus consists of an actinic radiation source positioned to irradiate the casting compound containing a photoinitiator as it enters the mold and/or radiate into the mold cavity through the sprue hole, windows and/or venting holes to effect the solidifying process.

Another example of a direct casting technique using photocurable polymers is taught by S. Nakamura, et al. in U.S. Pat. No. 5,990,190. In this system, an actinic radiation transparent mold is surrounded by sources of curing radiation which penetrate the mold from six directions. The need to completely surround the mold with radiation greatly increases the complexity and cost of the process. Furthermore, the need to create the master mold from a radiation transparent material imposes severe limitations on the structural integrity of the mold and limits the geometry of the end product, i.e. the casting.

V. Kadziela, et al., U.S. Pat. No. 6,829,362 for "Soft Molding Compound" combines the teachings of the above two references. The photocurable polymer is irradiated through a transparent mold and through an opening into the mold cavity, see the paragraph commencing at column 8 lines 13.

Heretofore, systems such as those referenced above and all other known techniques employ rigid master molds that do not permit undercuts or complex three-dimensional features in sacrificial mold patterns, or in the case of flexible master molds, employ rigid, opaque mold frames. Additional problems are encountered when the casting material is an actinic initiated polymerizable compound. Such compounds leave a residue on mold cavity walls which reacts with oxygen and other gasses in the atmosphere to create a film on mold cavity walls that causes cast items to adhere to the cavity walls, making it difficult to remove castings when molds are used repeatedly, such as in the case of automated systems.

OBJECTIVES OF THE INVENTION

It is a primary objective of the present invention to provide an automated system for creating sacrificial patterns through the use of soft, extremely flexible, transparent master molds that are purged with an inert gas between castings and encased in rigid, transparent mold frames.

An objective of the present invention is to provide a method and apparatus for casting a part, such as a sacrificial model for investment casting, from an actinic radiation curable material which is cast and cured in a mold supported by a rigid, transparent mold frame.

A prefered objective of the present invention is to provide a method and apparatus for casting a part, such as a sacrificial model for investment casting, from a radiation curable material which is cast and cured to a soft flexible state by radiation of a first frequency while in a mold supported by a rigid, transparent mold frame and cured to a final, ridged state by radiation of a second frequency after being removed from the mold.

A further objective of the present invention is to provide a method and apparatus for casting a part or a sacrificial model for investment casting from an actinic radiation curable material which is cast and cured in a mold that is purged with an inert gas before the liquid casting material is poured into the mold.

A further objective of the present invention is to provide a method and apparatus for casting a part or a sacrificial model, including undercuts and/or complex three-dimensional shapes, for investment casting from a radiation curable material which is cast and cured in a master mold that is flexible enough to allow the mold to be removed from the sacrificial part created therein by distorting and peeling the master mold from the sacrificial model.

Another objective is to provide a method for casting a radiation curable material incorporating a photoinitiator wherein the material is cured in the mold by an external source of radiation.

A further objective is to provide a method for casting a radiation curable material incorporating a plurality of photoinitiators wherein the material is cured to a first state while in the mold by an external source of radiation activating at least one photoinitiator and cured to a final state by activating at least one additional photoinitiator after the material is removed from the mold.

A still further objective of the invention is to provide a method for casting an actinic radiation curable material by irradiating the material as it is being pored or injected into the mold.

A further objective of the invention is to provide a method for casting an actinic radiation curable material by irradiating the material as it is being pored or injected into the mold, removing the material from the mold after it has cured to a first state and then irradiating the molded material by energy having a frequency different from the first source of irradiation to cause the molded material to reach a second state of cure.

Another objective of the invention is to photocure material within a mold by irradiating the material through a transparent mold frame.

Another objective of the invention is to photocure material within a mold by irradiating the material through a transparent mold frame and then photocure the material a second time after it is removed from the mold.

A further objective of the present invention is to provide a method and apparatus for casting a part or a sacrificial model, including undercuts and/or complex three-dimensional shapes, for investment casting from a radiation curable material which is cast and cured in a master mold comprised of more than two parts that create the mold cavity and is flexible enough to allow the mold to be removed from the sacrificial part created therein by distorting and peeling the master mold from the sacrificial model after the mold parts are removed from a stabilizing mold frame.

Other objects, features and advantages of this invention will be apparent from the drawings, specification and claims which follow.

SUMMARY OF THE INVENTION

The present invention teaches a process and apparatus for casting three-dimensional parts and sacrificial models from a class of casting compounds which incorporates a photo initiator and are solidified by actinic radiation. The class of casting compounds include, 1) compounds which act as conduits for the actinic radiation during and/or after hardening and 2) compounds which are hardened by an actinic radiation induced chain reaction throughout the body of fluid casting compound. These compounds allow the part being cast to be cured within transparent molds that are supported by transparent mold frames. The apparatus consists of an actinic radiation source positioned to irradiate the casting compound with energy of a first frequency while it is within a mold cavity. This radiation passes through the mold frame and mold wall to effect the solidifying process to a first state. A second radiation source is positioned to irradiate the partially cured casting with energy of a second frequency after it has been removed from the mold cavity. Separation of the molded part from the mold is enabled by purging the mold cavity with an inert gas prior to filling it with casting compound to eliminate sticky oxide residue on the mold walls and by the flexibility of the mold after removal of the stabilizing mold frame or the flexibility of the molded part before the second stage curing operation.

DESCRIPTION OF THE PREFERRED EMBODIMENT

Throughout the following description and claims, the terms "cure", "cured", "curing", "solidified", "solidifying", "hardening" and "hardened" are used interchangeably to describe a transition of material from liquid to solid. The term "radiation" is used to identify the radiation which initiates the transition of material, polymerization, from a liquid to a solid which may be soft, flexible, hard, ridged or solid having enhanced properties, such as having qualities that enhance its use as a sacrificial model in a lost wax process. The frequency of polymerization initiating radiation is dependent on the photo initiator or initiators used in the casting compound. They may respond to radiation ranging from radio frequencies through microwave, infrared, the visible spectrum and ultraviolet. In the preferred embodiment, the polymerization initiating radiation is in the ultraviolet blacklight range, 352 nanometers, for one radiation step and in the ultraviolet bluelight range, 368 nanometers, for other radiation step, each of which performs as actinic radiation causing a liquid-to-solid phase change or flexible to ridged change in the casting medium.

The various embodiments of the invention are perfected through the use of a flowable casting medium, 13, which may be poured or injected into a mold cavity and is hardened by radiation initiated polymerization. The casting medium is selected from a class of flowable compounds which include at least one photo initiator and become solidified, 1) when exposed to radiation and are transparent to the solidifying radiation whereby the casting functions as a radiation guide or light pipe during the curing process and/or 2) as a function of a chain reaction initiated by radiation. Actinic radiation of 352 and/or 368 nanometers is a preferred radiation for causing the transition of the casting medium from liquid to solid or from a first solid state to a state with enhanced properties for use as a sacrificial model in a lost wax process. Examples of typical photo initiators which may be used in the casting medium compound may be found in U.S. Pat. No. 6,025,114 issued to A. Popat et al. on Feb. 15$^{th}$, 2000 for "Liquid Photocurable Compositions". In the preferred embodiment, two or more photo initiators are incorporated into the molding compound and at least two are activated by radiation of different frequencies. The plural photo initiators cause the molding compound to transit to a first cure stage and then, controllably, to a second cure stage. By this process, the molded item may be cured to a flexible state to assist in demolding and later curded to a second state that facilitates use of the molded product.

Figures 1, 2:
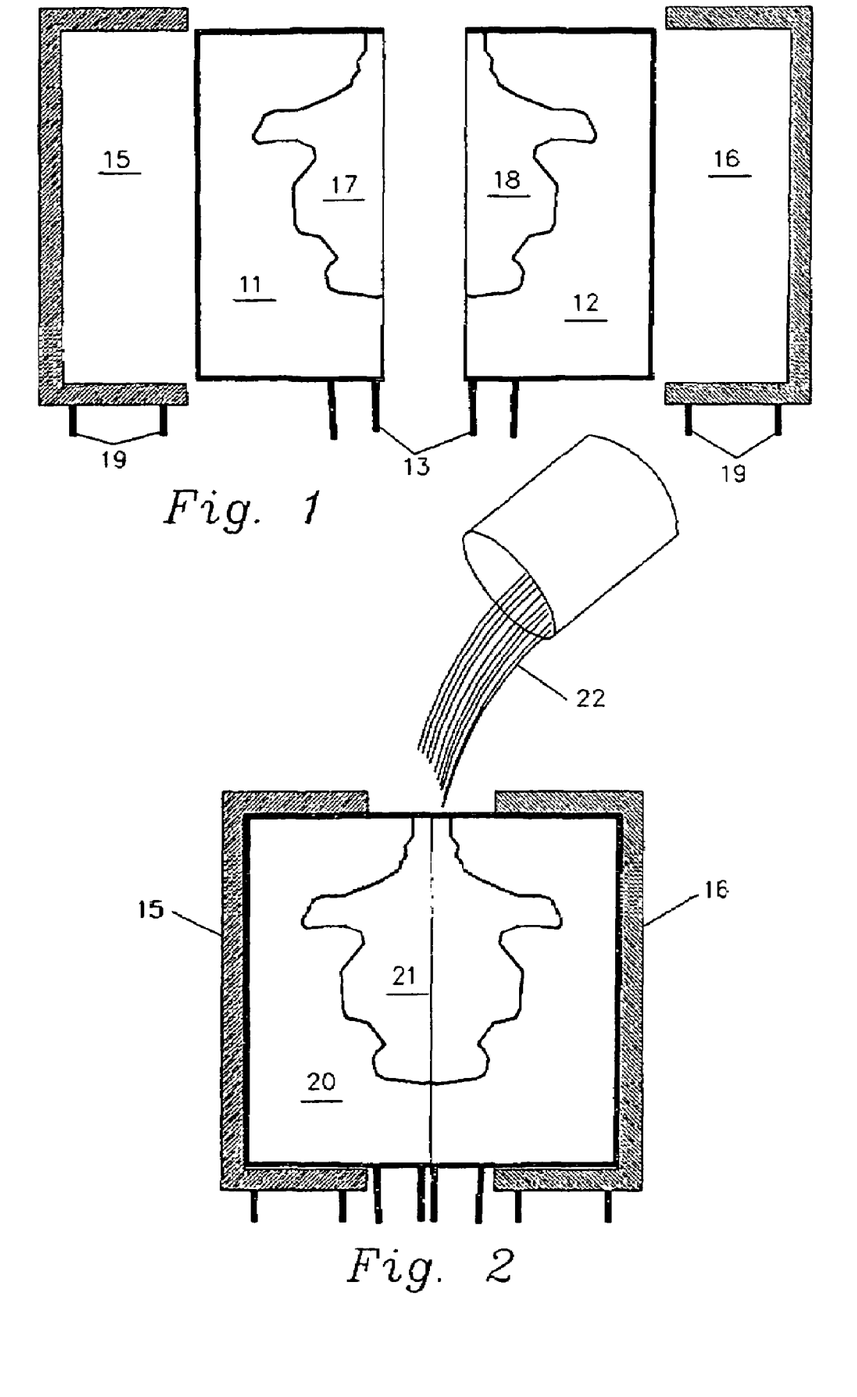
FIG. 1 is a sectional view of the elements comprising the enabling apparatus of the present invention shown in their unassembled configuration.
FIG. 2 is a sectional view of the elements comprising the enabling apparatus of the present invention shown assembled into a mold assembly and receiving a charge of liquid polymerizable molding compound.

FIG. 1 illustrates the mold assembly 10 of the present invention in its unassembled state immediately before assembly. It is comprised of a plurality of inter-fitting sections which form a mold cavity, 21 of FIG. 2, when assembled. The inter-fitting sections are formed from one of a class of materials which have the property of being radiation transparent, yielding to the touch, stretchable, pliable and shape retentive. In the preferred embodiment depicted in FIGS. 1 through 6, the mold has a bifurcated mold body 20 fabricated from a soft, flexible, radiation transparent material which is easily distorted to allow removal of complex three dimensional molded parts which may include undercuts. Each half of the mold, 11 and 12, includes a cavity, 17 and 18 respectively, which form the mold cavity 21 when the mold halves 11 and 12 are mated. The mold halves, 11 and 12, include a plurality of pins 13 which secure the mold to an assembly conveyor. Because of the soft flexible nature of the material from which the mold 20 is formed, it cannot maintain its integrity or the shape of the mold cavity during filling. Therefore, a mold frame is required to support the mold halves. The frame is comprised of transparent halves 15 and 16 which are dimensioned to enclose the mold halves 11 and 12 and stabilize the body of flexible mold material to allow injection of a liquid molding compound and prevent distortion of the mold 20 during the filling and polymerization processes. Means such as anchoring pins 19 function to secure the mold frame to an assembly conveyor.

FIG. 2 illustrates the mold assembly 10 configured with the mold halves 11 and 12 pressed together by the mold frame halves 15 and 16 to create the mold 20 incorporating the mold cavity 21. A casting medium composition 22 may be poured in or injected under pressure at this point because the soft, flexible mold 20 is stabilized by the mold frame.

Figure 3:
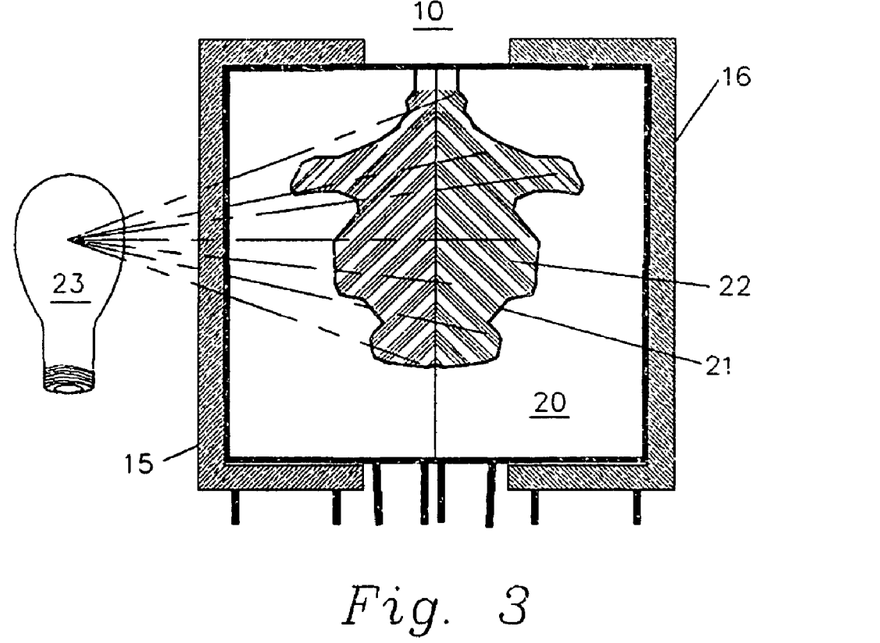
FIG. 3 is a sectional view of the mold assembly filled with molding compound and receiving polymerization initiating radiation.

FIG. 3 depicts the cavity of the mold 20 filled with the liquid casting composition 21 which incorporates a photo initiator that causes polymerization which causes solidification when the radiation from source 23 reaches the material after passing through the radiation transparent mold frame and mold. In the preferred embodiment the radiation source 23 generates ultraviolet actinic rays which pass through the mold frame, 15 and 16, and mold 20 to initiate polymerization and convert the liquid compound 21 into a solid casting 24. Actinic radiation is used in the preferred embodiment but the invention contemplates the use of a broad range of radiation, such as, but not limited to, radio frequency, high frequency, microwave, x-ray, infrared, visible light, blacklight ultraviolet and blacklight blue ultraviolet. The radiation used to initiate polymerization is a function of the initiator used in the casting compound and the transparency of the mold and mold frame.

Figure 4:
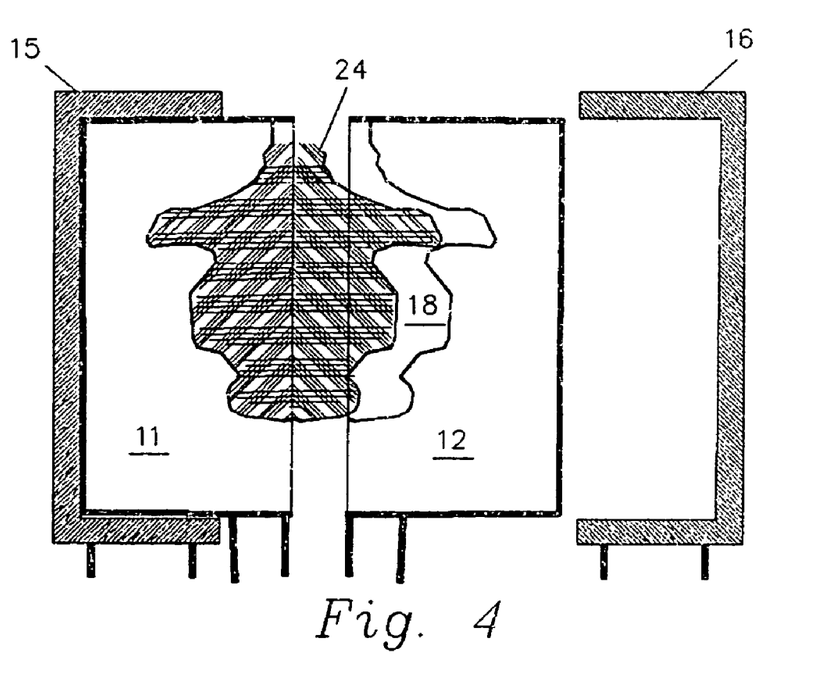
FIG. 4 is a sectional view of the mold assembly shown during the initial stage of the demolding process with the mold frame removed from one mold half from which the polymerized part is partially extracted.

As the casting compound 21 in the irradiated mold cavity hardens, it becomes the cast part 24 and mold frame 16 is removed as depicted in FIG. 4. This allows mold half 12 to become destabilized to the point where it will stretch and its cavity 18 deforms as the casting 24 is separated by moving the mold half 12 away from the frame stabilized mold half 11.

Figure 5:
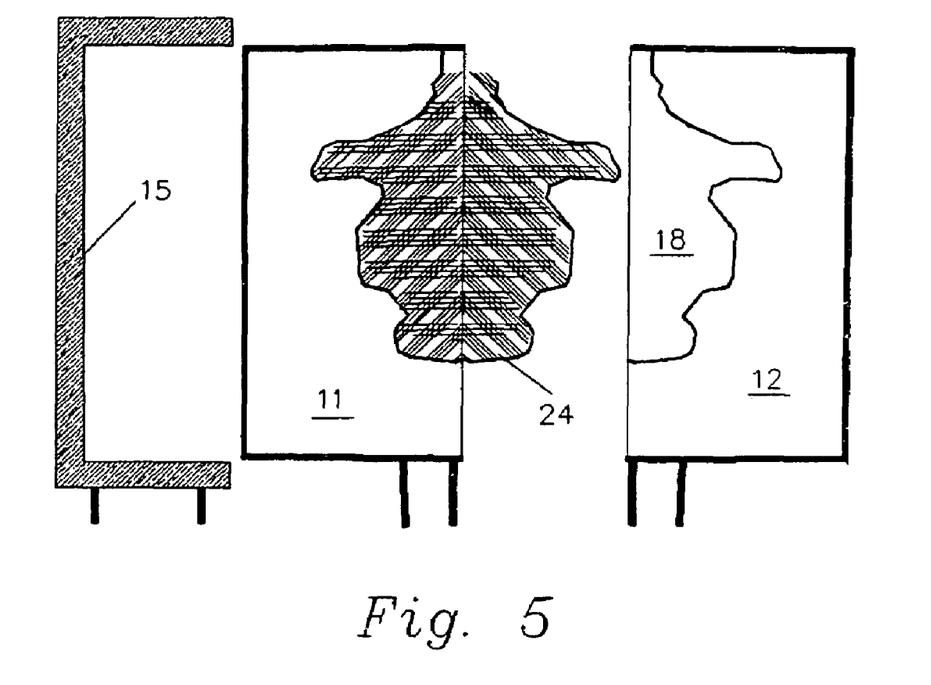
FIG. 5 is a sectional view of the mold assembly shown with the mold frame completely removed prior to the final demolding step.
Figure 6:
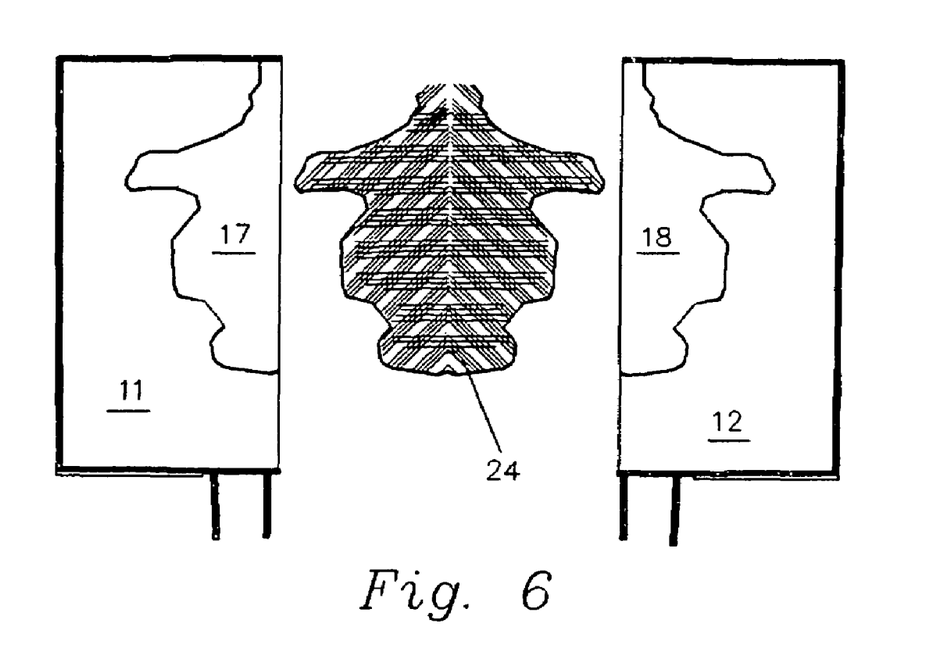
FIG. 6 is a sectional view of the flexible mold halves freed from their mold frame and the molded sacrificial model demolded.

After the mold half 12 is removed from the casting, mold frame 15 is removed from mold half 11 as illustrated in FIG. 5. This allows the casting 24 to be extracted from the mold cavity 17 because when the frame 15 is removed, the mold half 11 is free to stretch and deform and thus release the casting. When the casting 24 is free of both mold halves 11 and 12 as in FIG. 6, it may be conveyed to additional processing stations which may include additional radiation initiated polymerization, deburring, polishing and packaging.

Figure 7:
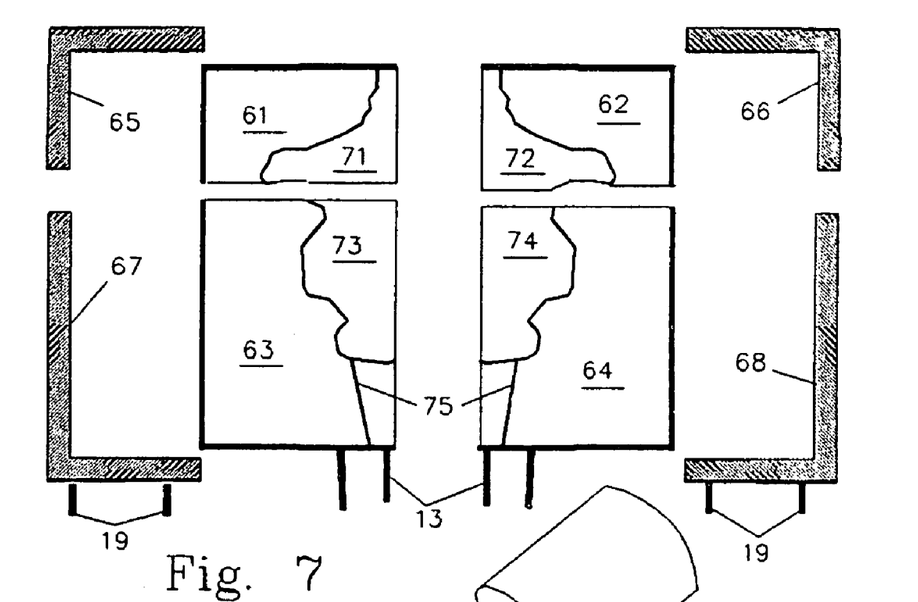
FIG. 7 is a sectional view of the elements comprising an alternate embodiment of the enabling apparatus of the present invention shown in their unassembled configuration.
Figure 8:
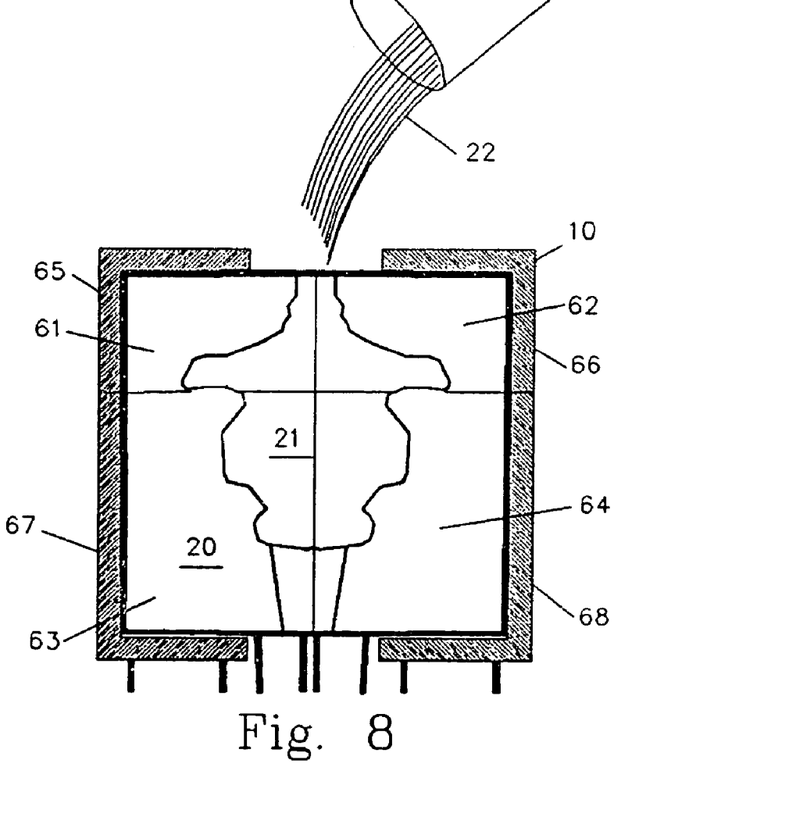
FIG. 8 is a sectional view of the elements comprising the alternate embodiment of the enabling apparatus of the present invention shown assembled into a mold assembly and receiving a charge of liquid polymerizable molding compound.

In the alternate embodiment depicted in FIGS. 7 and 8, the mold is comprised of four sections, 61 through 64, which minimize under cuts in the part to be cast in the assembled mold body 20. The sections are fabricated from a soft, flexible, radiation transparent material which is easily distorted to allow removal of complex three dimensional molded parts which may include undercuts. Each section of the mold includes a cavity, 71 through 74, which form the mold cavity 21 when the mold sections 61, 62, 63 and 64 are mated. The assembled mold includes a plurality of pins 13 which secure the mold to an assembly conveyor. Because of the soft flexible nature of the material from which the mold 20 is formed, as in the preferred embodiment, it cannot maintain its integrity or the shape of the mold cavity during filling. Therefore, a mold frame is required to support the mold halves. The frame may be the same as used in the preferred embodiment, i.e., comprised of transparent halves 15 and 16 which are dimensioned to enclose the mold sections, 61 through 64, and stabilize the body of flexible mold material to allow injection of a liquid molding compound and prevent distortion of the mold 20 during the filling and polymerization processes. Means such as anchoring pins 19 function to secure the mold frame to an assembly conveyor.

FIG. 8 illustrates the mold assembly 10 configured with the mold sections 61, 62, 63 and 64 pressed together by the mold frame halves 15 and 16 to create the mold 20 and form the mold cavity 21. A casting medium composition 22 may be poured in or injected under pressure at this point because the soft, flexible mold 20 is stabilized by the mold frame to a point where the mold cavity is ridged but gasses trapped in the mold cavity may escape but the casting compound 22 may not. Under certain circumstances it is desirable to construct the mold frame from a plurality of sections, 65 through 68, which are dimensioned so that the mold sections, 61 through 64, are pressed together so tightly that gasses or casting compound cannot escape. This minimizes extrusion ridges at the joints of the mold to simplify clean up of the cast part after it is removed from the mold. In such cases. one or more small holes, 75, may be punched in one or more of the mold sections 61 through 64 to allow gasses to escape during the cavity filling operation. The holes may be very small, such as might be created by a 22 gauge needle.

The procedures illustrated by FIGS. 1 through 8 may be accomplished manually or by a variety of automated means. One such automated means is illustrated by FIG. 9A as an exemplary automated application enabled by the present invention.

Figure 9A:
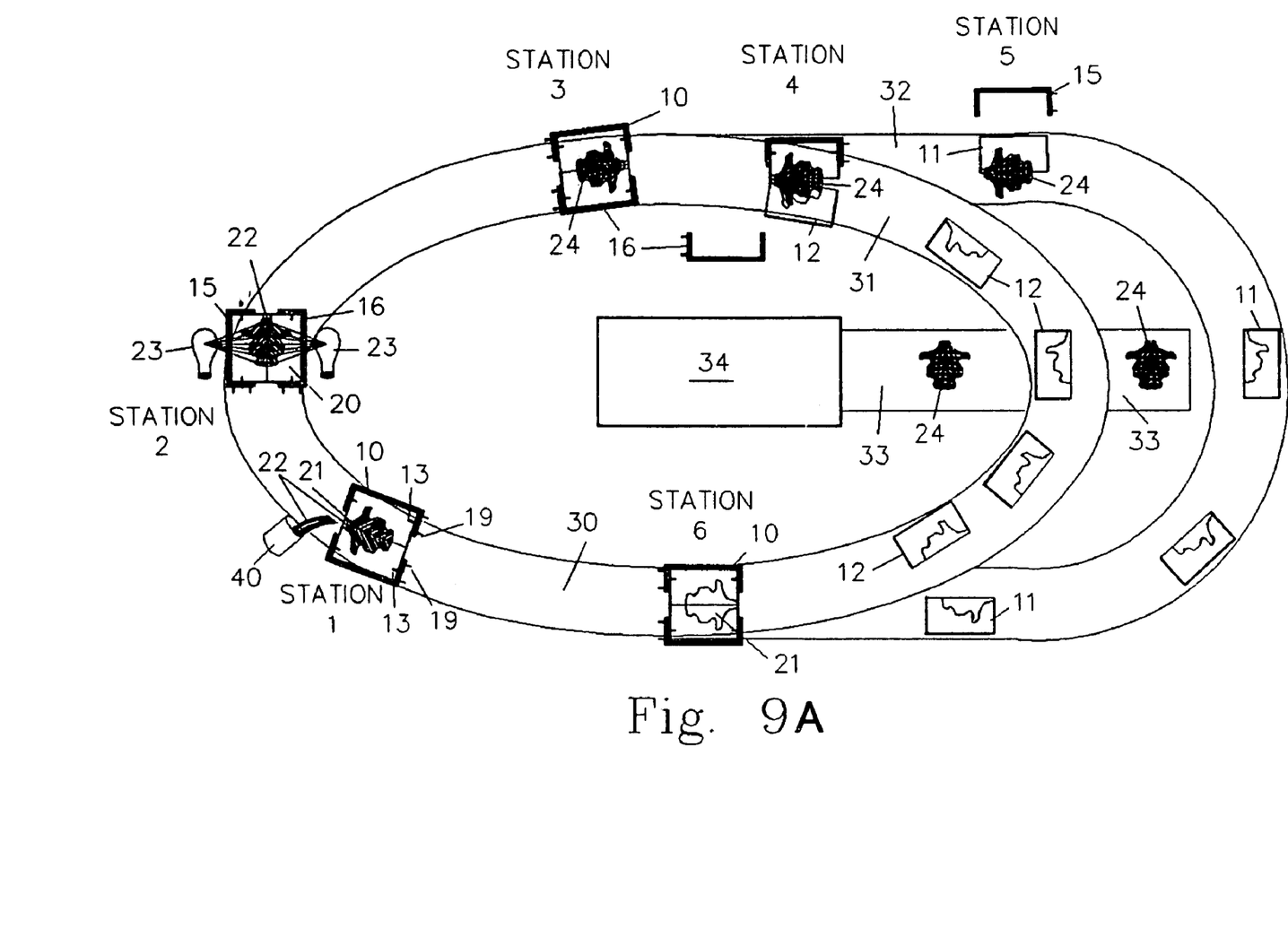
FIG. 9A is a schematic view of an exemplary automated production facility employing the mold assembly of the present invention and employing a single stage irradiation process.
Figure 10:
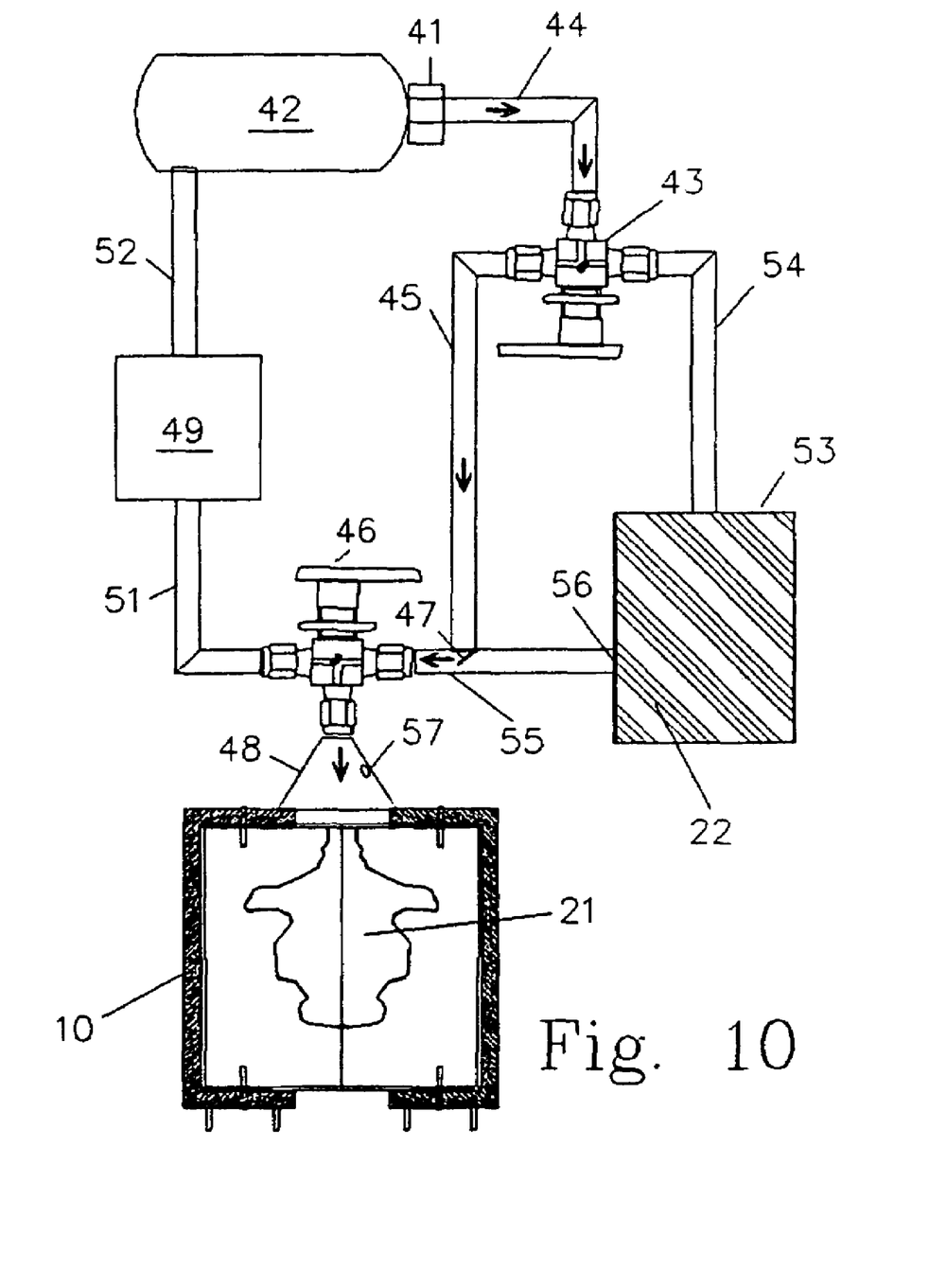
FIG. 10 is a schematic representation of the mold purge operation illustrating the inert gas flow path.
Figure 11:
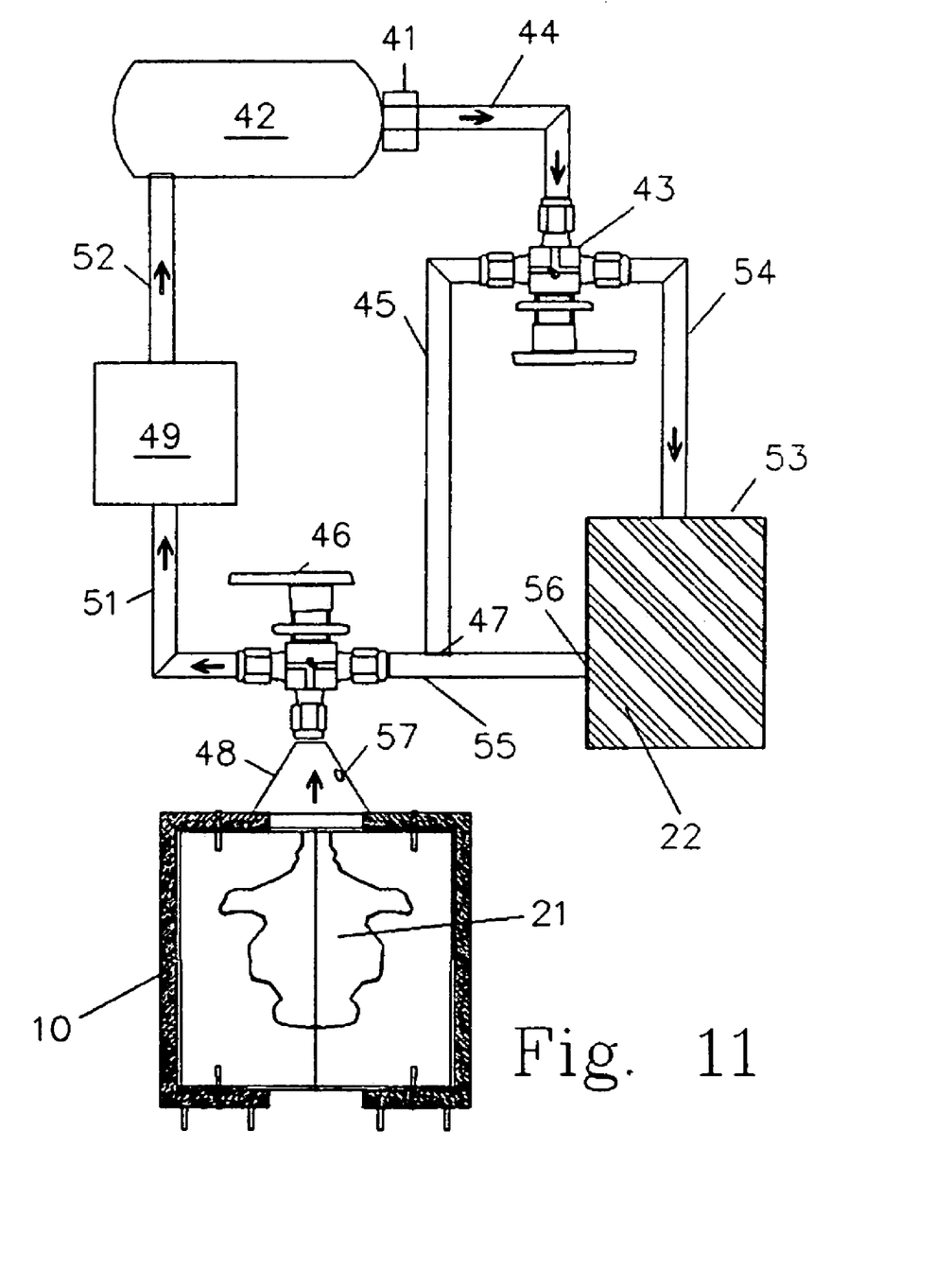
FIG. 11 is a schematic representation of the mold evacuation process illustrating the inert gas flow path.

In FIG. 9A, the mold assembly 10 is filled with a liquid casting compound containing a photo initiator as it passes through station 1. The mold halves 11 and 12 and mold frames 15 and 16 are secured to the conveying means 30 by a plurality of securing devices 13 and 19. The retaining devices 19 used to hold the mold frames to the conveyer are releasable but the retaining means 13 securing the mold halves to the conveyer are not. After the mold cavity 21 is filled, either by pressure injection via a system such as illustrated in FIGS. 10 through 11 or simple pouring 40, the mold assembly continues along the conveyer to station 2 where it is subjected to polymerization initiating radiation from one or more sources 23. The radiation passes thought the mold frame members 15 and 16 and mold 20 to initiate polymerization of the liquid compound within the mold cavity 21.

The mold assembly 10 proceeds to station 3 where it arrives after the casting compound 21 has polymerized into a hardened casting 24. At this station, mold frame 16 is removed, leaving the mold half 12 unsupported but secured to the conveyer. At station 4 the conveyer splits in two, dividing into separate paths, a primary path 31 along which mold half 12 travels and a secondary path 32 which mold half 11 follows. As the paths diverge, mold half 12, which is secured to its conveyer 31, is peeled away from the casting 24 as conveyer 31 turns away from conveyer 32. The angular velocity of both conveyers is maintained constant, i.e., the relative speed of the conveyers changes so the mold halves are always on the same radial.

At station 5, frame 15 is removed from mold half 11 so that mold half will be free to stretch and deform as the casting 24 is removed and dropped on conveyer 33 which transports the casting to a finishing and packaging means 34. Because the mold halves are maintained on a common radial, they mate up as the conveyers 31 and 32 converge at station 6 where the mold frames are joined to form the complete mold assembly 10 to begin a repeat of the casting and unmolding process.

Figure 9B:
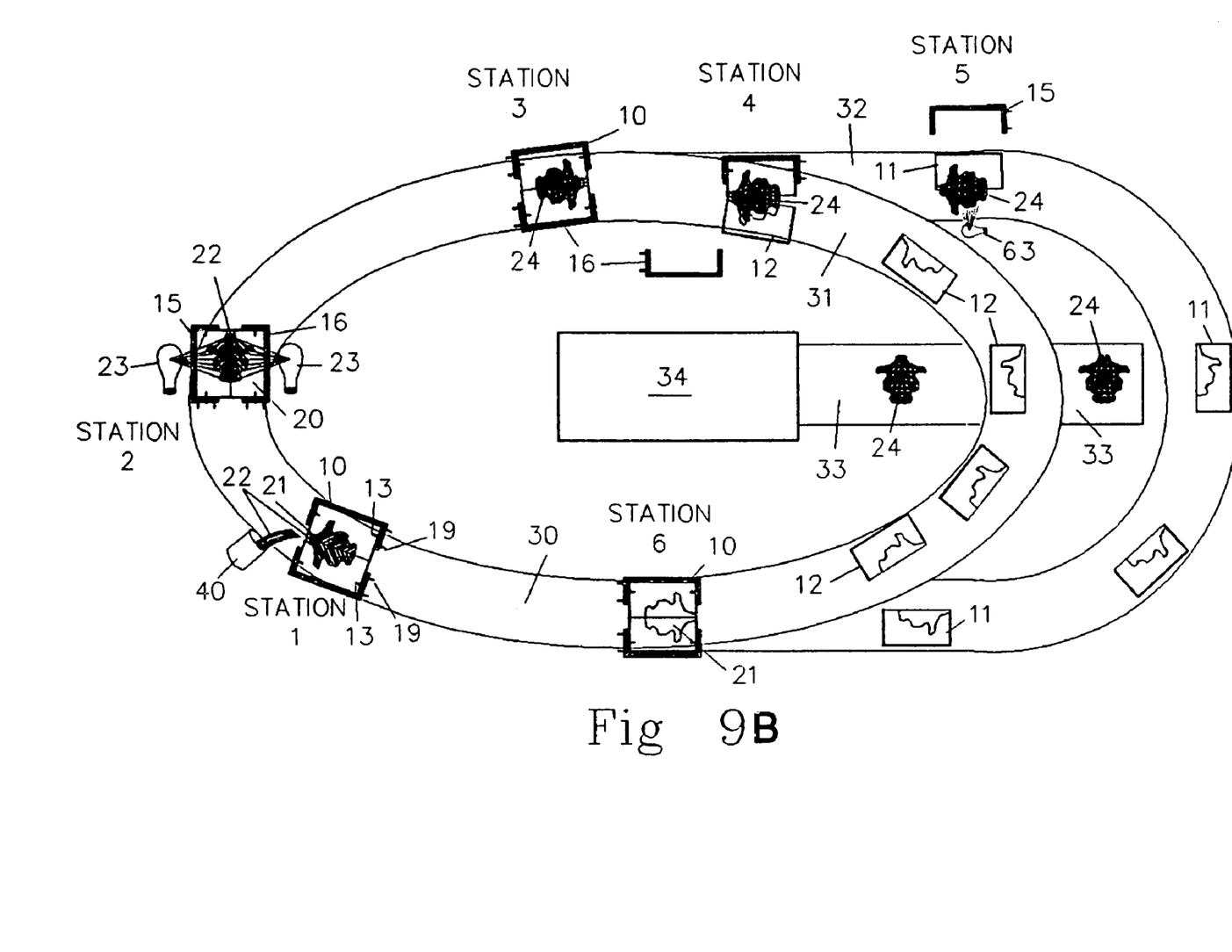
FIG. 9B is a schematic view of an exemplary automated production facility employing the mold assembly of the present invention and employing a two stage irradiation process wherein the second irradiation step occurs after a portion of the mold has been removed from the partially cured part.

FIG. 9B illustrates an exemplary preferred embodiment wherein a radiation source, 63, generating a frequency different from radiation source 23, initiates a second polymerization process which causes the solid casting to transition from a first stage to a second stage having properties more desirable in a sacrificial model. For instance, the properties of the casting may transition from a soft or flexible solid to a hard or ridged solid or from a solid with poor burn-out qualities to a solid with properties more desirable for a sacrificial model to be used in a lost wax casting process. As illustrated in FIG. 9B, radiation from source 63 is preferably applied directly to the casting 24 after an inter-fitting section 12 of the mold 20 is removed.

Figure 9C:
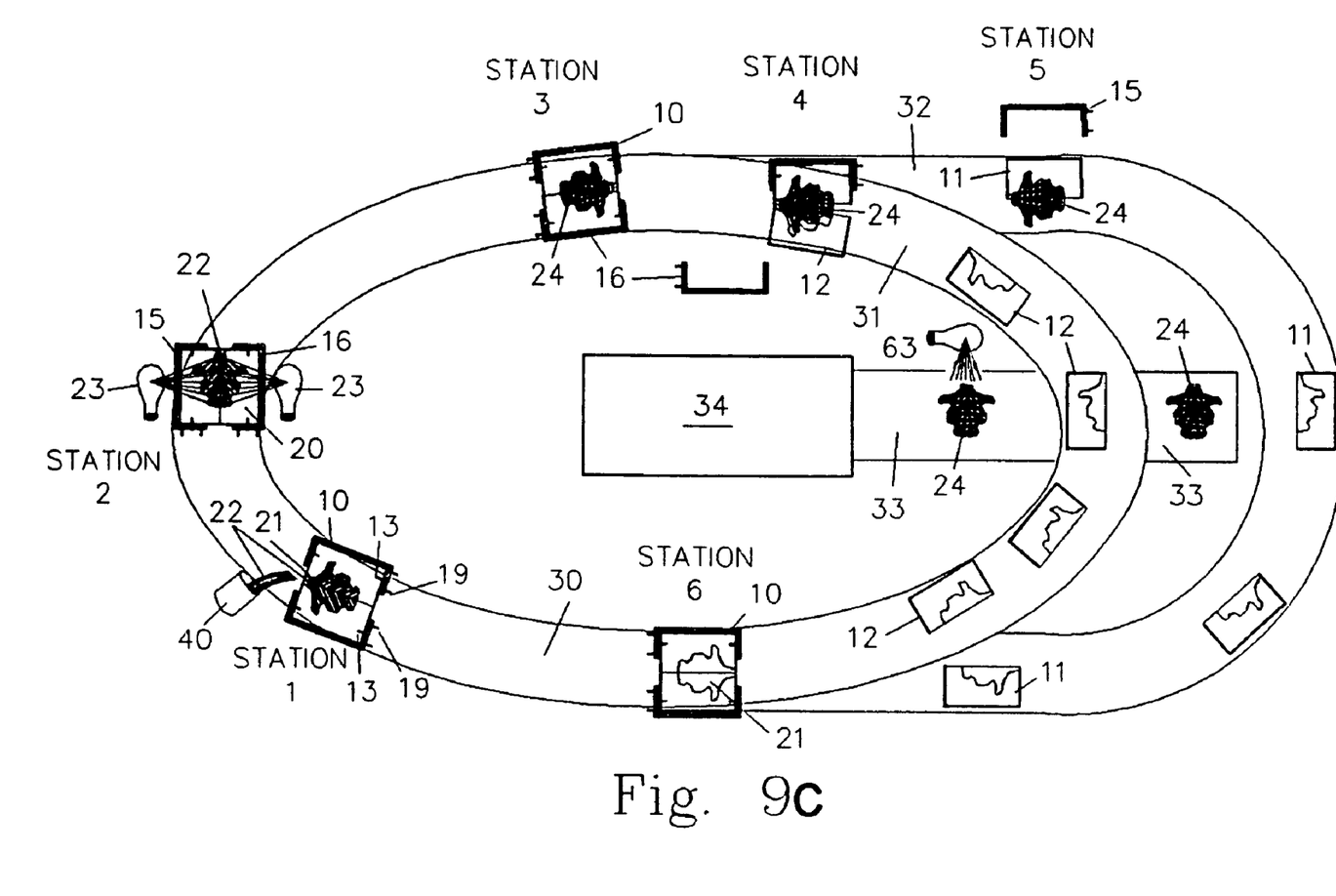
FIG. 9C is a schematic view of an exemplary automated production facility employing the mold assembly of the present invention and employing a two stage irradiation process wherein the second irradiation step occurs after the partially cured part has been completely removed from the mold.

FIG. 9C illustrates another exemplary preferred embodiment wherein a radiation source, 63, generating a frequency different from radiation source 23, initiates a second polymerization process which causes the solid casting to transition from a first stage to a second stage having properties more desirable in a sacrificial model. For instance, the properties of the casting may transition from a soft or flexible solid to a hard or ridged solid or from a solid with poor burn-out qualities to a solid with properties more desirable for a sacrificial model to be used in a lost wax casting process. As illustrated in FIG. 9C, radiation from source 63 is preferably applied directly to the casting 24 after it has been removed from the mold 20.

FIG. 10 schematically illustrates the principles of the preferred mold filling process. A gas pressure regulator 41 controls the outlet pressure of an inert gas source 42 to prevent the gas from blowing out through the matting faces of the mold sections or vent holes 75. The gas is coupled to a gas control switching valve 43 inlet port via conduit 44. This valve controls gas flow mutually exclusively between gas conduits 45 and 54. The valve is set to the purge position which allows the gas to flow from conduit 44 via the gas control valve 43 into conduit 45 which is connected to the fill switching valve 46 via a one way, nonreturn valve 47 and then into the mold via connector 48. The fill switching valve includes inlet and outlet ports which are mutually exclusively connected to the valves switching outlet, the mold fill port, which is connected to the mold cavity's sprue via the mold connector 48. The inert gas purges the air from the mold cavity 21 to eliminate the adverse effects caused by the casting compound reacting with oxygen and other air source contaminants. The primary adverse effects eliminated are those that cause the cast part to stick to the mold cavity walls and thus inhibit removing the casting from the mold. The preferred inert gas is argon because it is heavier than air and sinks to the bottom of the mold cavity to ensure complete purging of air.

The fill valve 46 is then moved to the evacuate position as shown in FIG. 11. In this position, pump 49 partially evacuates the mold cavity via conduit 51 and returns the inert gas to its storage container 42 via conduit 52. The partial vacuum thus created in the mold cavity assists the casting compound fill operation and eliminates the possibility of trapped gas pockets that would degrade the cast part. The reduced pressure within the mold cavity 21 during the evacuation process causes seams at the mating faces of the mold sections and vent holes to seal.

Figure 12:
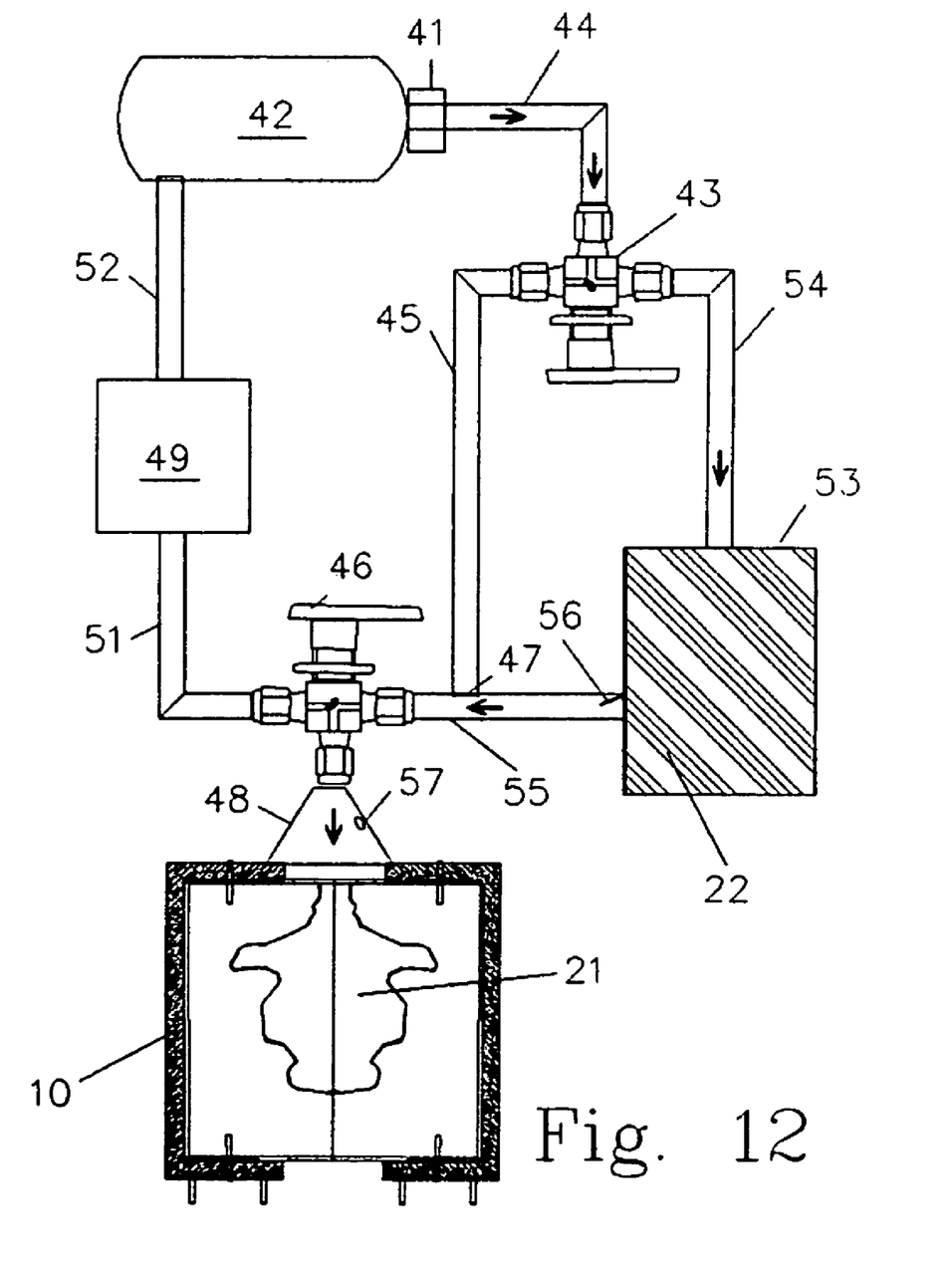
FIG. 12 is a schematic representation of the mold operation illustrating the inert gas flow path and resulting casting compound flow path.
Figure 13:
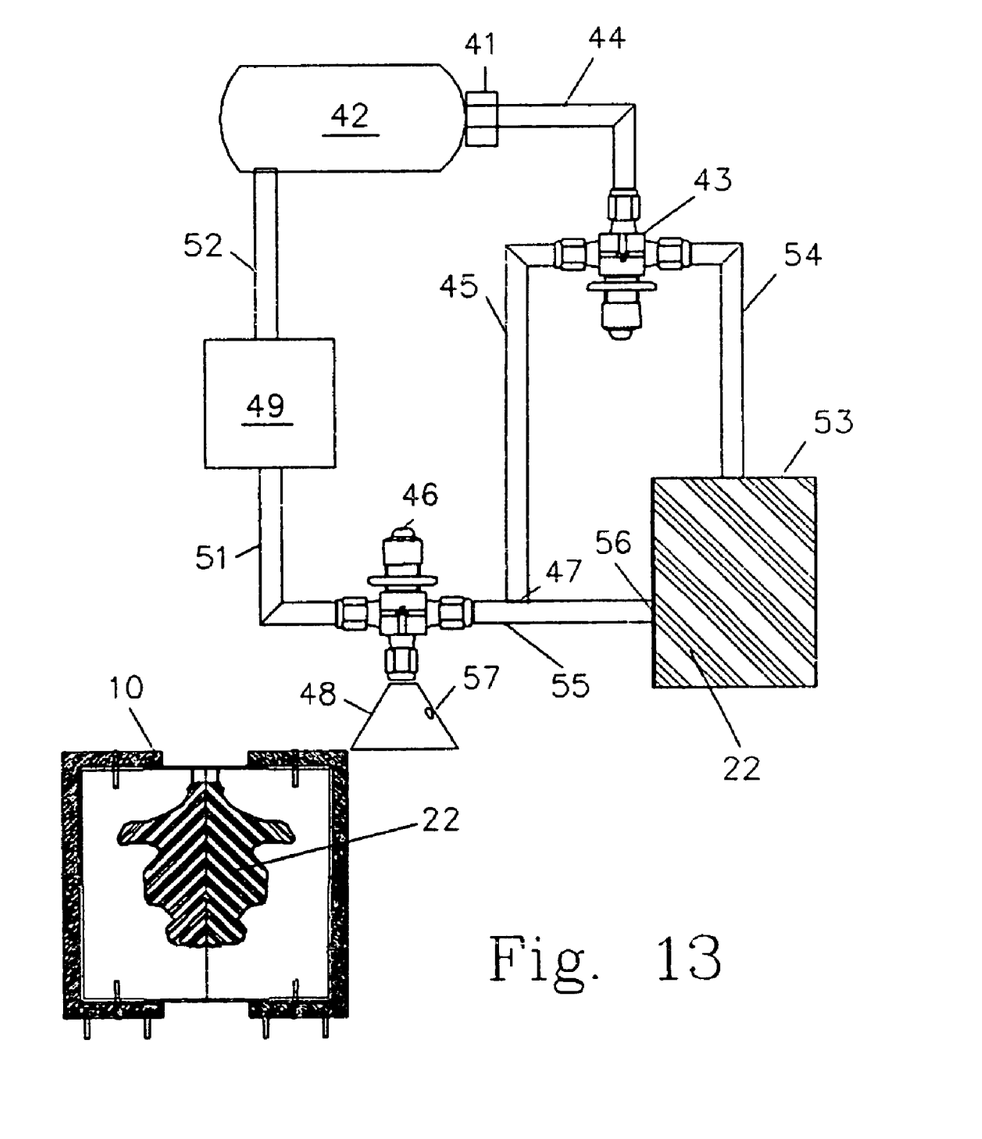
FIG. 13 is a schematic representation of the mold purge, evacuate and fill system in the off position as a filled mold leaves station 1 of FIGS. 9A, B or C.

As the mold cavity 21 is evacuated, the gas control valve 43 is moved to the fill position and the gas pressure regulator 41 increases the pressure applied to conduit 44 to a value which will force casting compound into the mold cavity when the fill control valve 46 is placed in the fill/purge position as illustrated in FIG. 12. With the fill control valve in the fill position, the pressurized inert gas applied to the casting composition reservoir 53 via gas control valve 43 and conduit 54 forces casting compound 22 into conduit 55 via one way valve 56. The fill control valve 46 is then placed in the fill/purge position as illustrated by FIG. 12 and the pressurized casting compound flows into the mold cavity 21 until pressure sensor 57 detects the back pressure created when the mold 10 is filled. This causes the gas and fill valves to be turned to the off position as shown in FIG. 13 and the fill connecter 48 to be removed from the mold 10. If the conveyer was stopped during the fill operation, it is restarted and moves until the next mold is positioned at fill station 2. In the preferred embodiment, the inert gas used is argon because it is heavier than air and readily sinks to the bottom of the mold.

While preferred embodiments of this invention have been illustrated and described, variations and modifications may be apparent to those skilled in the art. Therefore, we do not wish to be limited thereto and ask that the scope and breadth of this invention be determined from the claims which follow rather than the above description.

The invention claimed is:

1. A method for casting parts, including the steps of:

creating a mold incorporating a mold cavity by assembling a plurality of inter-fitting sections fabricated from one or more of a class of materials which have the properties of being radiation transparent, yielding to the touch, stretchable, pliable and shape retentive which are dimensioned to create said mold cavity;

stabilizing said mold by enclosing it in a radiation transparent mold frame;

regulating the outlet pressure of a source of inert gas to maintain a first pressure which will not result in gas escaping between mating faces of said plurality of inter-fitting sections;

purging said mold cavity with said inert gas maintained at said first pressure;

evacuating said mold cavity;

regulating said outlet pressure of said source of inert gas to maintain a second pressure great enough to force said casting compound into said mold cavity;

filling said evacuated mold cavity with a casting compound by applying said inert gas at said second pressure to the source of said casting compound;

subjecting said casting compound within said mold cavity to a polymerizing initiating radiation and thereby causing said casting compound to polymerize into a solid casting;

removing said radiation transparent mold frame from said mold; and removing said inter-fitting sections from said casting.

2. A method for casting parts as defined by claim 1, including the step of subjecting said solid casting to a second polymerizing initiating radiation after at least one of said inter-fitting sections are removed from said casting during said step of removing said inter-fitting sections from said casting and thereby causing said casting to polymerize into a solid casting having enhanced properties.

3. A method for casting parts as defined by claim 2, wherein said steps of subjecting said casting compound within said mold cavity to a polymerizing initiating radiation and thereby causing said casting compound to polymerize into a solid casting and subjecting said solid casting to a second polymerizing initiating radiation employ radiation in different bands selected from the class of radiation bands including the 352 nanometer band and the 368 nanometer band.

4. A method for casting parts as defined by claim 1, including the step of subjecting said solid casting to a second polymerizing initiating radiation after said step of removing said inter-fitting sections from said casting and thereby causing said casting to polymerize into a solid casting having enhanced properties.

5. A method for casting parts as defined by claim 4, wherein said steps of subjecting said casting compound within said mold cavity to a polymerizing initiating radiation and thereby causing said casting compound to polymerize into a solid casting and subjecting said solid casting to a second polymerizing initiating radiation employ radiation in different bands selected from the class of radiation bands including the 352 nanometer band and the 368 nanometer band.

6. A method for casting parts as defined by claim 1 wherein said first and second pressures are equal.

* * * * *